(12) United States Patent
Chheda et al.

(10) Patent No.: US 7,542,769 B1
(45) Date of Patent: Jun. 2, 2009

(54) DYNAMIC CONTROL OF EIGHTH-RATE GATING OF THE REVERSE LINK FUNDAMENTAL CHANNEL IN A WIRELESS COMMUNICATION SYSTEM

(75) Inventors: Ashvin Chheda, Plano, TX (US); Miroslav Budic, Murphy, TX (US); Michael Leibovitch, Ottawa (CA); Dominic Peluso, Ottawa (CA); Jeffrey Stanier, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1030 days.

(21) Appl. No.: 10/610,297

(22) Filed: Jun. 30, 2003

(51) Int. Cl.
*H04Q 7/20* (2006.01)
(52) U.S. Cl. .................. 455/453; 455/452.1; 455/452.2
(58) Field of Classification Search .......... 455/450, 455/451, 452.2, 452.1, 453; 370/329, 335
See application file for complete search history.

(56) References Cited

U.S. PATENT DOCUMENTS

| 6,078,570 | A   | * | 6/2000  | Czaja et al. ........... 370/331 |
| 6,181,738 | B1  |   | 1/2001  | Chheda et al. |
| 6,215,982 | B1  | * | 4/2001  | Trompower ........... 455/63.3 |
| 6,246,673 | B1  |   | 6/2001  | Tiedemann, Jr. et al. |
| 6,496,706 | B1  | * | 12/2002 | Jou et al. ............. 455/522 |
| 6,510,145 | B1  | * | 1/2003  | Kim et al. ............ 370/329 |
| 6,542,744 | B1  |   | 4/2003  | Lin |
| 6,545,989 | B1  |   | 4/2003  | Butler |
| 6,683,906 | B1  | * | 1/2004  | Iwamatsu ............. 375/142 |
| 6,717,924 | B2  | * | 4/2004  | Ho et al. ............. 370/311 |
| 6,967,970 | B2  | * | 11/2005 | Terry et al. .......... 370/458 |
| 7,039,029 | B2  | * | 5/2006  | Lee et al. ............ 370/335 |
| 7,089,037 | B2  | * | 8/2006  | Harris ............... 455/562.1 |
| 2002/0119772 | A1 | * | 8/2002 | Yoshida .............. 455/423 |
| 2003/0032431 | A1 | * | 2/2003 | Chang ................. 455/438 |
| 2003/0076812 | A1 | * | 4/2003 | Benedittis ............ 370/350 |
| 2003/0137951 | A1 | * | 7/2003 | Otsuka et al. ......... 370/328 |

OTHER PUBLICATIONS

*Physical Layer for cdma2000*, Archi. & Net. Lab., Sep. 21, 2000.
Ghaleb, I.A.; *Technical Details of the cdma2000 Reverse Link*, Jun. 30, 2002.

* cited by examiner

*Primary Examiner*—Cong Van Tran
(74) *Attorney, Agent, or Firm*—Trop, Pruner & Hu, P.C.

(57) ABSTRACT

During a wireless call, eighth rate gating is dynamically switched off per sector for either all calls in the sector of the base station or per mobile station when a pre-determined forward link loading threshold is exceeded in that sector, and dynamically switched on eighth rate gating for either per mobile station or for all calls in the sector of the base station when the forward link loading in that sector drops below a predetermined forward link threshold.

29 Claims, 6 Drawing Sheets

DYNAMIC CONTROL OF EIGHTH-RATE GATING OF THE REVERSE LINK FUNDAMENTAL CHANNEL IN A WIRELESS COMMUNICATION SYSTEM

BACKGROUND OF THE INVENTION

I. Field of the Invention

The present invention relates to communications, and more particularly to improved channel gating in a wireless communication system.

II. Description of the Related Art

Multiple access techniques are designed to make efficient use of the limited radio frequency spectrum. Examples of such techniques include time division multiple access (TDMA), frequency division multiple access (FDMA), and code division multiple access (CDMA).

There has been an increasing demand for wireless communications systems to be able to transmit digital information at high rates. One method for sending high rate digital data from a wireless communication device to a central base station is to allow the wireless communication device to send the data using spread spectrum techniques of CDMA. CDMA wireless technology, governed by Telecommunication Industry Association/Electronic Industry Association (TIA/EIA) Interim Specification-95 (IS-95) and TIA/EIA IS-2000 specifications, both of which are hereby incorporated by reference, employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M. K. Simon, Spread Spectrum Communications, Volume I, pp. 262-358.

In a CDMA-type mobile station system, multiple signals are transmitted simultaneously on the same frequency. A particular receiver then determines which signal is intended for that receiver by the unique spreading code in each signal. The signals at that frequency, without the particular spreading code intended for that particular receiver, appear to be noise to that receiver and are ignored.

Since multiple mobile stations and base stations transmit on the same frequency, power control is an important component of the CDMA modulation technique. A higher power output by a mobile station and/or base station increases its signal quality, but also increases the interference experienced by the other mobile stations and base stations in the system. In order to keep the mobile stations and base stations from transmitting at too much power, thereby decreasing system capacity, some form of power control must be implemented.

The mobile station can aid the base station in the control of the power on the forward link (from the base station to the mobile station) by feedback on the reverse link (from the mobile station to the base station). This is accomplished by either a power control message that is sent when appropriate thresholds are triggered or an erasure indicator bit on a reverse link frame that indicates the status of a previously sent forward link frame. The base station may then adjust its power level to the specific user accordingly. This is referred to in the art as slow forward link power control.

In fast forward power control, the mobile station sends power-up or power-down commands to the base station to adjust the amount of power used by the base station for that particular mobile station. This adjustment corrects the bit-energy-to-noise-density of the received signal based on the performance of the forward traffic channel on a frame-by-frame basis. As the environment for a particular mobile station changes, the bit-energy-to-noise-density required may change in order to achieve a given frame error rate. The mobile station would instruct the base station to power up or down as needed to meet the required frame error rate. This decrease in the required receive power allows greater transmission rates to be processed successfully, or conversely allows a larger number of simultaneous users to access the system.

A reverse link power control process is also used by the base station to adjust the mobile station power level output by transmitting a power-up or power-down command to the mobile station. This adjustment corrects the bit-energy-to-noise-density of the received signal based on the performance of the reverse traffic channel on a frame by frame basis. As the environment for a particular mobile phone changes, the bit-energy-to-noise-density required may change in order to achieve a given frame error rate. The base station would instruct the mobile station to power up or down as needed to meet the required frame error rate. This decrease in the required receive power allows greater transmission rates to be processed successfully, or conversely, the interference between a set of reverse link signals to be decreased.

Another power control process is the use of transmission gating of the fundamental channel during lower sub-rate transmission. A fundamental channel is transmitted on the reverse link (the link from the wireless communication device to the base station) to carry information over the reverse link to the base station. The fundamental channel can be used in one of four sub-rates; full rate, half rate, quarter rate and eighth rate. Variable rate speech encoding of the fundamental channel utilizing these various rates is a commonly used method for speech transmission that offers particular advantages in increasing capacity, while maintaining high quality of perceived speech. Variable rate speech encoding transmits frames at full rate during speech, and frames at eighth rate during pauses in speech, with half rate and quarter rate as transitional states. It has been found that a majority of traffic channel frames during human speech are eighth-rate frames. When the variable rates speech encoder is providing frames at less than maximum rate, power consumption may be lessened by gating one or more transmission amplifiers such that only parts of the frame are transmitted.

A transmission gating feature for the reverse link fundamental channel provides a measurable increase in radio phone battery power life and reduction in interference energy on the reverse link. However, there is a forward link reduction in capacity when reverse link gating is enabled. By operating at the exemplary 50% duty cycle for eighth-rate frames, the ability to maintain power control on the reverse link and forward link is affected. During gating, the network must revert to 400 Hz forward link power control as it does not know the rate of the call on the reverse link until the end of the frame. As a result, the base station must assume for purposes of forward link power control that every frame is potentially an eighth-rate frame and hence only 50% of the power control groups would be valid. Thus, the update rate is reduced by a factor of two to avoid such an error. For example, the usual 800 Hz power control mechanism is reduced to 400 Hz, or from 16 decisions per frame to 8 decisions per frame. This reduction in power control has an associated loss in capacity because under certain channel conditions the lower rate power control results in an increase in per link user power (reduction in capacity) and frame error rate for the eighth-rate frames. Simulations have shown that on average a network operator can expect a 10% capacity loss in a system where every user is gating on the reverse link during eighth-rate transmission. Therefore, there is a need for an improved technique of transmission gating on the fundamental channel that provides the ability to balance the mobile station power savings of gating against the impact on system capacity.

SUMMARY OF THE INVENTION

According to the present invention, a method and wireless communications system provides transmission gating of the reverse fundamental channel. The process and system is capable of dynamically controlling a reverse link fundamental channel transmission gating feature as a function of a forward link channel capacity or loading within a sector of a base station in the wireless communication system.

In a preferred embodiment of the present invention, the forward link loading threshold is set between 75-85%. Also in a preferred embodiment of the present invention, the reverse link fundamental channel transmission gating feature is dynamically controlled for all mobile stations in the sector of the base station.

In an alternative embodiment of the present invention, the process and system provides dynamically switching off the reverse link fundamental channel transmission gating feature in the sector of the base station when a forward link loading threshold is exceeded in that sector; and dynamically switching on the reverse link fundamental channel transmission gating feature in the sector of the base station when the forward link loading threshold is not exceeded in that sector; and, wherein switching only occur once at the initialization of a call for a given mobile station in the wireless communication system to place the reverse link fundamental channel transmission gating feature in an initial state, and thereafter maintaining the reverse link fundamental channel transmission gating feature in the initial state for the mobile station regardless of subsequent dynamic changes in the forward link channel capacity.

In still another alternative embodiment of the present invention, the process and system provides dynamically switching off or on the reverse link fundamental channel transmission gating feature during a handoff of the mobile station from one subset of sectors to another, wherein the transmission gating state is determined by the sector that has the least excess capacity (i.e., the sector with the least available radio-frequency (RF) resources).

In still another preferred embodiment, the reverse link fundamental channel transmission gating feature is the eighth-rate gating of a reverse link fundamental channel operating at an eighth frame rate.

DETAILED DESCRIPTION OF PREFERRED EMBODIMENTS

Figure 1:
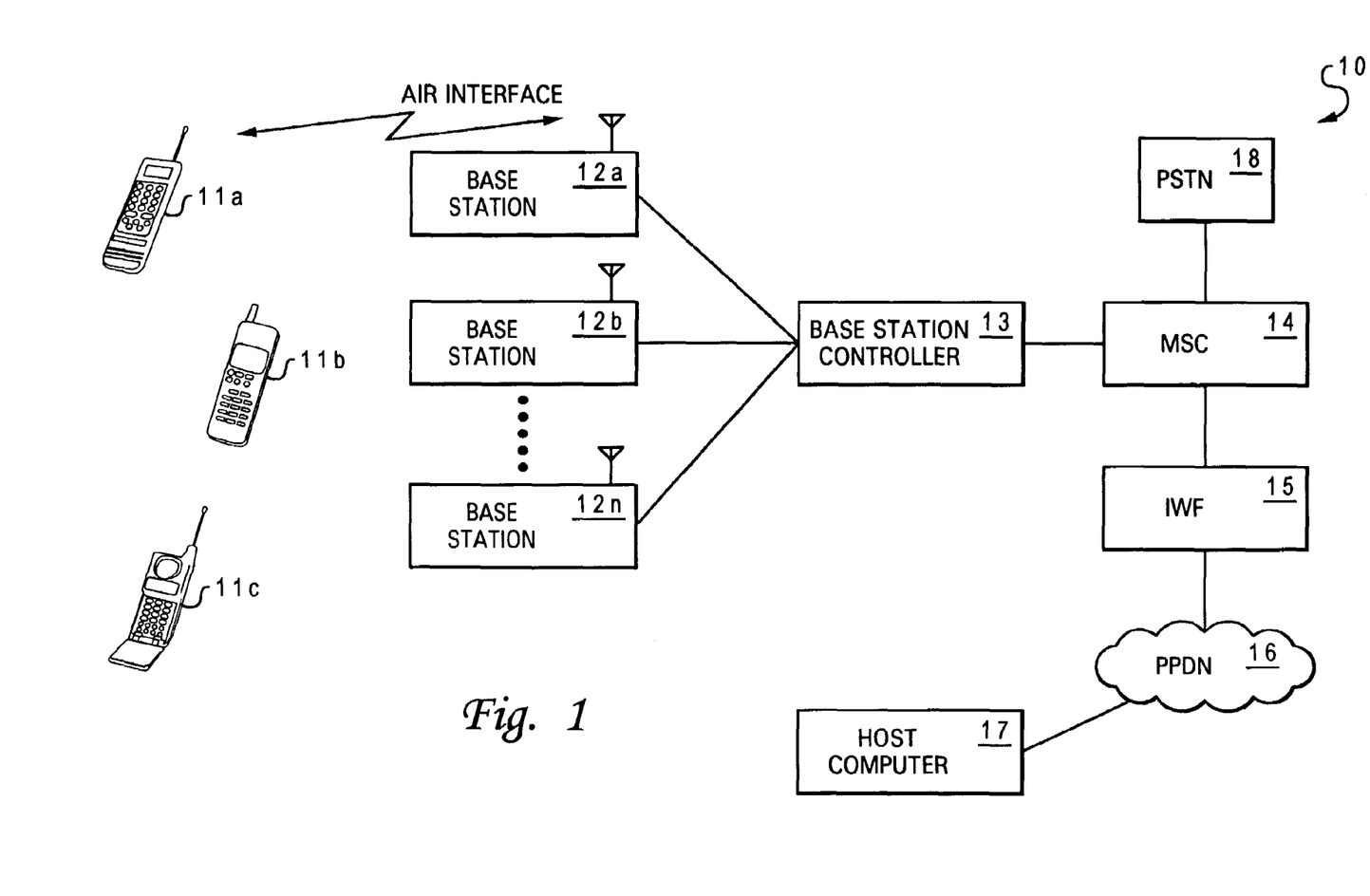
FIG. 1 depicts a pictorial diagram of a mobile telephone communication network in which a preferred embodiment of the present invention may be implemented.

The present invention is applicable in all digital protocol-based mobile telephone communications systems having a wireless data link. Referring now to the drawings and in particular to FIG. 1, there is depicted a pictorial diagram of a mobile telephone communication network 10 in which a preferred embodiment of the present invention may be implemented. Communication network 10 utilizes a digital protocol such as code division multiple access (CDMA). As shown, communication network 10 includes several base station transceivers (BTS) 12a-12n located at various locations within communication network 10. Each of base stations 12a-12n is controlled by a base station controller (BSC) 13.

Coupled to BSC 13 is a mobile switching center (MSC) 14 for supporting CDMA and connectivity to a public switched telephone network (PSTN) 18. In addition, MSC 14 also supports various call processing functions. MSC 14 is coupled to a network Interworking Function (IWF) 15 via an L-Interface. IWF 15 is coupled to a host computer system 17 via a public packet data network (PPDN) 16. Host computer system 17 may be, for example, a midrange computer having a processor (not shown), a main memory (not shown), and a storage device (not shown) as is well-known to those skilled in the art. Host computer system 17 communicates with PPDN 16 utilizing a standard procedure that is also well-known to those skilled in the art.

Within the service area of communication network 10, there are several mobile stations (MS), such as mobile telephones 11a, 11b, and 11c. The software for handling the exchange of data packets between one of mobiles 11a-11c and one of base stations 12a-12n within communication network 10 commonly resides within mobiles 11a-11c and BSC 13.

Figure 2:
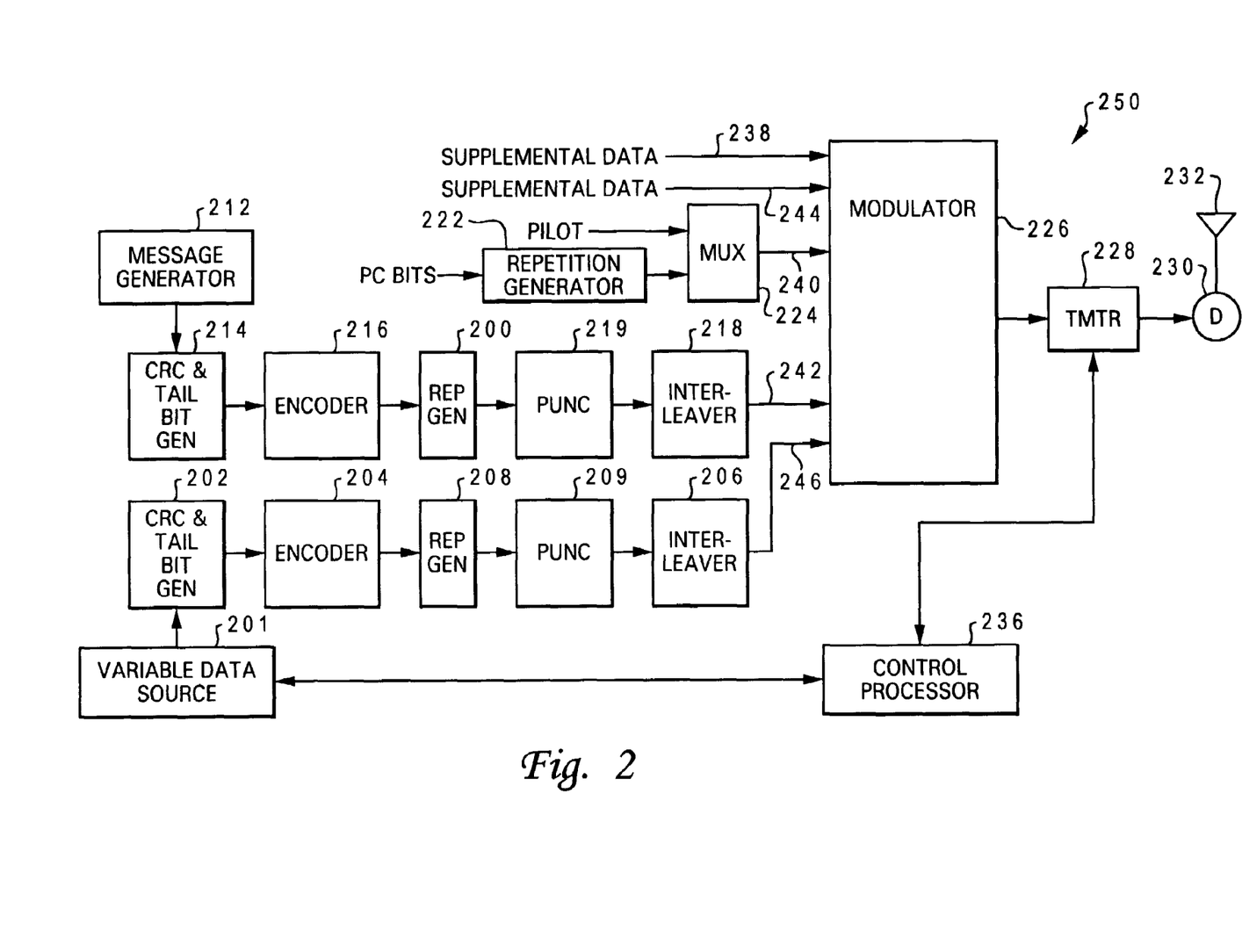
FIG. 2 illustrates a functional block diagram of an exemplary embodiment of the transmission system of the present invention embodied in a wireless communication device.

FIG. 2 illustrates a functional block diagram of an exemplary embodiment of the transmission system of the present invention embodied in a MS such as wireless communication device 250. It will be understood by one skilled in the art that the methods described herein could be applied to transmission from a central base station (not shown) as well. It will also be understood that various functional blocks shown in FIG. 2 may not be present in other embodiments of the present invention. The functional block diagram of FIG. 2 corresponds to an embodiment that is useful for operation according to the TIA/EIA Standard IS-2000. Other embodiments of the present invention are useful for other standards including Wideband CDMA (WCDMA) standards as proposed by the standards bodies ETSI and ARIB. It will be understood by one skilled in the art that owing to the extensive similarity between the reverse link modulation in the WCDMA standards and the reverse link modulation in the IS-2000 standard, extension of the present invention to the WCDMA standards is easily accomplished.

In the exemplary embodiment of FIG. 2, the wireless communication device transmits a plurality of distinct channels of information which are distinguished from one another by short orthogonal spreading sequences. Five separate code channels are transmitted by the wireless communication device: 1) a first supplemental data channel 238, 2) a time multiplexed channel of pilot and power control symbols 240, 3) a dedicated control channel 242, 4) a second supplemental data channel 244 and 5) a fundamental channel (FCH) 246. The first supplemental data channel 238 and second supplemental data channel 244 carry digital data which exceeds the capacity of the fundamental channel 246 such as facsimile, multimedia applications, video, electronic mail messages or other forms of digital data. The multiplexed channel of pilot and power control symbols 240 carries pilots symbols to allow for coherent demodulation of the data channels by the base station and power control bits to control the energy of transmissions of the base station or base stations in communication with wireless communication device 250. Control channel 242 carries control information to the base station such as modes of operation of wireless communication device 250, capabilities of wireless communication device 250 and other necessary signaling information. Fundamental channel 246 is the channel used to carry primary information from the wireless communication device to the base station. In the case of speech transmissions, the fundamental channel 246 carries the speech data.

Supplemental data channels 238 and 244 are encoded and processed for transmission by means not shown and provided to modulator 226. Power control bits are provided to repetition generator 222 which provides repetition of the power control bits before providing the bits to multiplexer (MUX) 224. In multiplexer 224 the redundant power control bits are time multiplexed with pilot symbols and provided on line 240 to modulator 226.

Message generator 212 generates necessary control information messages and provides the control message to CRC and tail bit generator 214. CRC and tail bit generator 214 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 216 which provides forward error correction coding upon the control message. The encoded symbols are provided to repetition generator 220 which repeats the encoded symbols to provide additional time diversity in the transmission. Following repetition generator certain symbols are punctured according to some predetermined puncturing pattern by puncturing element (PUNC) 219 to provide a predetermined number of symbols within the frame. The symbols are then provided to interleaver 218 which reorders the symbols in accordance with a predetermined interleaving format. The interleaved symbols are provided on line 242 to modulator 226.

Variable rate data source 201 generates variable rate data. Variable rate speech encoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses approximately one quarter the predetermined maximum number of bits to encode the frame and eighth rate uses approximately one eighth the predetermined maximum number of bits to encode the frame.

Variable rate date source 201 provides the encoded speech frame to CRC and tail bit generator 022. CRC and tail bit generator 202 appends a set of cyclic redundancy check bits which are parity bits used to check the accuracy of the decoding at the base station and appends a predetermined set of tail bits to the control message in order to clear the memory of the decoder at the base station. The frame is then provided to encoder 204, which provides forward error correction coding on the speech frame. The encoded symbols are provided to repetition generator 208 which provides repetition of the encoded symbol. Throughput repetition generator 208 is punctured with certain symbols by puncturing element 209 according to a predetermined puncturing pattern in order to provide a predetermined number of symbols within the frame. The symbols are then provided to interleaver 206, which reorders the symbols in accordance with a predetermined interleaving format. The interleaved symbols are provided on line 246 to modulator 226. In the exemplary embodiment, modulator 226 modulates the data channels in accordance with a code division multiple access modulation format and provides the modulated information to transmitter (TMTR) 228, which amplifies and filters the signal and provides the signal through duplexer 230 for transmission through antenna 232. In the exemplary embodiment, variable rate data source 201 sends a signal indicative to the rate of the encoded frame to control processor 236. In response to the rate indication, control processor 236 provides control signals to transmitter 228 indicating the energy of the transmissions.

In IS-95 and cdma2000 systems, a 20 ms frame is divided into sixteen sets of equal numbers of symbols, referred to as power control groups (PCGs). The reference to power control is based on the fact that for each PCG, the base station receiving the frame issues a power control command in response to a determination of the sufficiency of the received reverse link signal at the base station. Because there is much redundancy introduced into the frames that are of less than full rate, the energy at which the symbols are transmitted may be reduced in approximate proportion to amount of additional redundancy in the frame. Remote station 250 responds to closed loop power control commands from the base station and from internally generated open loop power control commands based on the received forward link signal. The responses to the power control algorithms will cause the transmission energy to vary over the duration of a frame.

Figure 3:
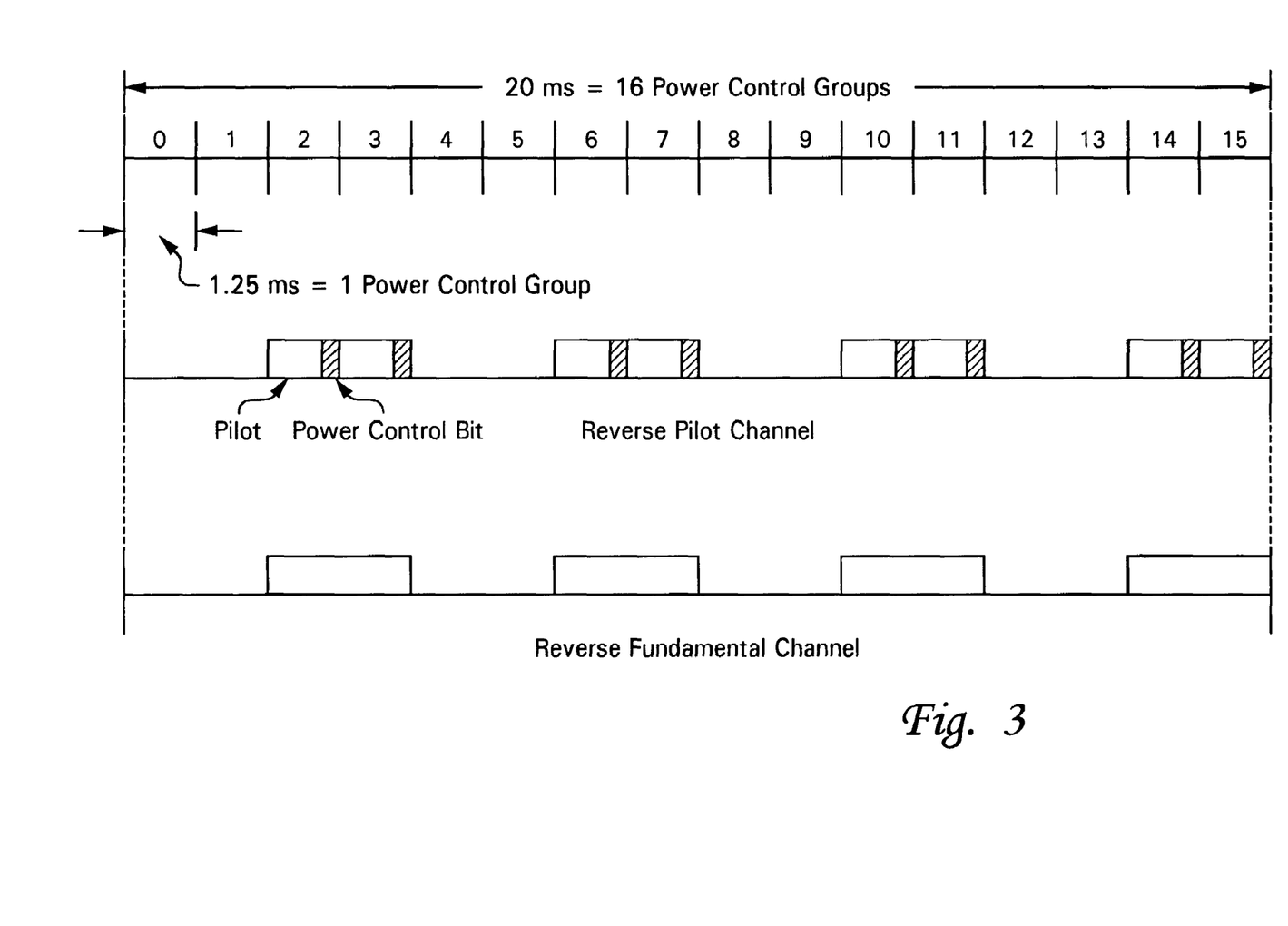
FIG. 3 shows a diagram of eighth-rate gating on the reverse fundamental channel of a 16 PCG frame.

For a half rate frame, the number of bits prior to encoding is half of the number of bits used in the full rate frame. After encoding, the encoded bits are repeated four times (as a reference, the full rate frame bits are repeated twice). The encoded, repeated bits are then interleaved. The interleaver structure is such that it distributes the repeated symbols over the frame in such a way to attain maximum time diversity. For similar fading channel conditions, the half rate frame then requires less than half the power that the full rate frame requires for the same frame error rate performance as a result of the time diversity. For quarter-rate transmission, the number of bits prior to encoding is 9/32 of the number of bits used in full rate transmission. After encoding, the coded bits are repeated eight times, and then 1 of 9 are deleted in pre-determined fashion. The resulting coded-repeated-punctured stream is interleaved. For similar fading channel conditions, the quarter rate frame then requires less than 9/32 the power that the full rate frame requires for the same frame error rate performance as a result of the time diversity. For eighth-rate transmission, the number of bits prior to encoding is 5/32 of the number of bits used in full rate transmission. After encoding, the coded bits are repeated sixteen times, and then 1 of 5 bits are deleted in a pre-determined fashion. The resulting coded-repeated-punctured stream is interleaved. For similar fading channel conditions, the eighth rate frame then requires less than 5/32 the power that the full rate frame requires for the same frame error rate performance as a result of the time diversity. During the periods of eighth-rate transmission where gating is used, in which the traffic channel transmissions are gated off, transmitter 228 gates the transmission of half of the frame to reduce battery consumption and increase reverse link capacity. The frames are transmitted at a 50% duty cycle in which half of the time the energy of the transmission is gated off. FIG. 3 shows eighth-rate gating on the reverse fundamental channel of a sixteen PCG frame.

Figure 4:
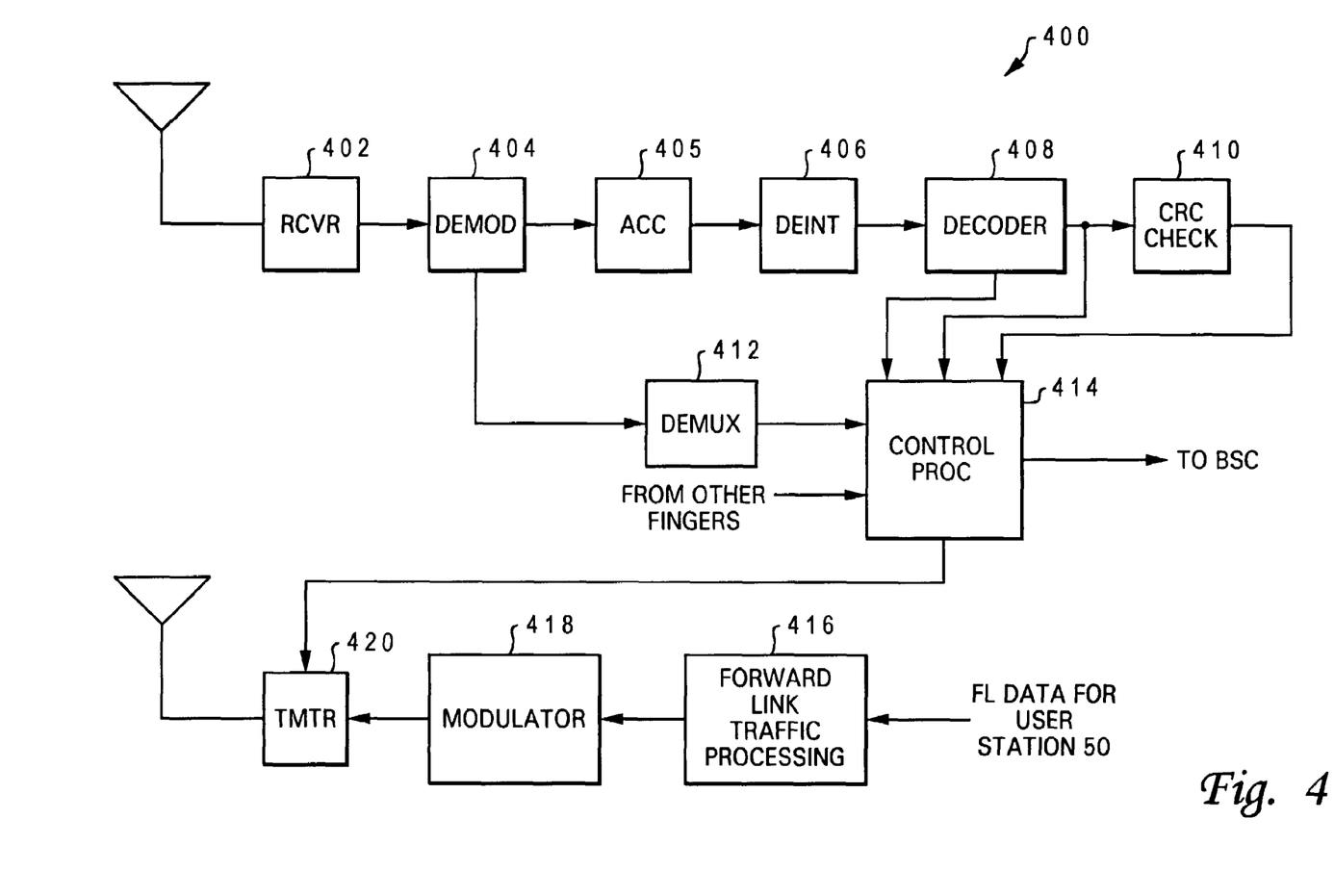
FIG. 4 depicts a functional block diagram of selected portions of a base station in accordance with a preferred embodiment of the present invention.

Turning now to FIG. 4, a functional block diagram of selected portions of a base station 400 is depicted, in accordance with the present invention. Reverse link RF signals from the wireless communication device 50 (FIG. 2) are received by receiver (RCVR) 402, which downconverts the received reverse link RF signals to a baseband frequency. In the exemplary embodiment, receiver 402 down converts the received signal in accordance with a QPSK demodulation format. The baseband signal is then demodulated by demodulator 404.

The demodulated signal is provided to accumulator 405. Accumulator 405 sums the symbol energies of the redundantly transmitted PCGs of symbols. The accumulated symbols energies are provided to de-interleaver 406 which reorders the symbols in accordance with a predetermined de-interleaving format. The reordered symbols are provided to decoder 408 which decodes the symbols to provide an estimate of the transmitted frame. The estimate of the transmitted frame is then provided to CRC check 410 which determines the accuracy of the frame estimate based on the CRC bits included in the transmitted frame.

In the exemplary embodiment, base station 400 performs a blind decoding on the reverse link signal. Blind decoding describes a method of decoding variable rate data in which the receiver does not know a priori the rate of the transmission. In the exemplary embodiment, base station 400 accumulates, deinterleaves and decodes the data in accordance with each possible rate hypothesis. The frame selected as the best estimate is based on quality metrics such as the symbol error rate, the CRC check and the Yamamoto metric.

An estimate of the frame for each rate hypothesis is provided to control processor 414 and a set of quality metrics for each of the decoded estimates is also provided. Quality metrics that may include the symbol error rate, the Yamamoto metric and the CRC check. Control processor selectively provides one of the decoded frames to the remote station user or declares a frame erasure.

Figure 5:
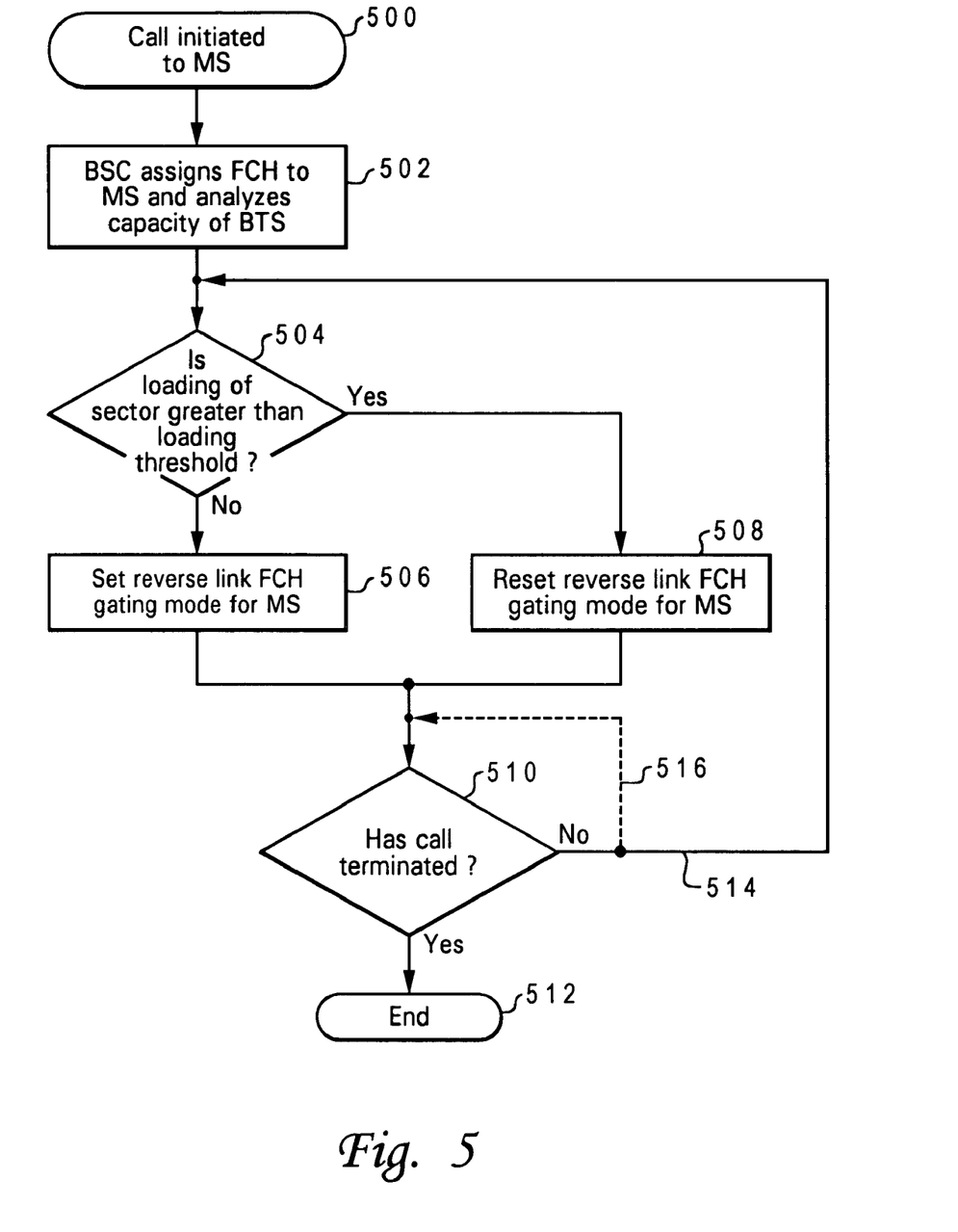
FIG. 5 shows a flow diagram of a method for dynamic control of eighth-rate gating in a wireless communication system, in accordance with a preferred embodiment of the present invention.

Referring now to FIG. 5, there is shown a flow diagram of a method for dynamic control of eighth-rate gating in a wireless communication system, in accordance with a preferred embodiment of the present invention. In accordance with the present invention, a loading threshold related to the forward link capacity loading is used to dynamically control the transmission gating feature in the reverse FCH of the wireless communication network. Because eighth-rate gating negatively impacts forward link capacity, the wireless communications system operator can customize the loading threshold to selectively switch on and off the gating feature to customize the trade-off between the capacity loss with the battery life savings for a particular environment, application or system.

At step 500, a wireless call is initiated with the MS. At step 502, the BSC assigns a FCH to the MS. In conjunction with assigning the channel, the BSC analyzes the forward link channel capacity of the BTS currently communicating with the MS. At step 504, the BSC determines whether the current loading (i.e., percent of total capacity being utilized by mobile stations) of the BTS is greater than a pre-determined loading threshold set by the system operator of the BSC.

At step 504, it is determined whether the loading of the forward link channel capacity has exceeded the loading threshold set by the operator. We have determined from our simulations (shown in the graph of FIG. 6 and discussed below) that a preferred loading threshold is set between 75-85%. For example, in the preferred embodiment, the loading threshold is set at an 80% loading capacity, resulting in a 5% capacity loss, while approximately 70% of the users are gating.

If the decision at step 504 is negative, the process proceeds to step 506, where the reverse link FCH gating mode is set (turns on the channel gating) for the MS or, in an alternative embodiment, all mobiles in the sector. If the decision at step 504 is affirmative, the process proceeds to step 508, where the reverse link FCH gating mode is reset (turns off the channel gating) for the MS or, in an alternative embodiment, all mobiles in the sector. From steps 506 and 508, the process proceeds to step 510, where it is determined if the initiated call has terminated. If so, the process ends for that MS at step 512. As will be appreciated, the BCS will continue this process for other calls that are still active in the sector. If the MS has not terminated the call, the process returns along path 514 to step 504, where the loading capacity is again measured against the loading threshold. In a preferred embodiment, appropriate hysterisis would be designed between two pre-determined loading thresholds set at step 504 to prevent spurious triggers.

As described, the preferred embodiment involves dynamically switching off the gating feature per sector for all calls in the sector or per MS when an appropriate forward link loading threshold is exceeded in that sector, and dynamically switching on the gating feature per sector for all calls or per MS when the forward link loading in that sector drops below a predetermined forward link threshold, at any time during the call. However, this involves excessive messaging in the network backhaul between the BSC and BTS nodes, and over the air messaging to instruct the MS to switch the gating on and off. In order to avoid this excessive messaging within the system, the process in an alternative preferred embodiment would loop back via path 516, instead of path 514, to decision 510 until the call terminates. This embodiment makes the gating decision only once at the beginning of a call, and thereafter maintains the selected mode throughout the call regardless of dynamic changes in the forward link FCH capacity.

Figure 6:
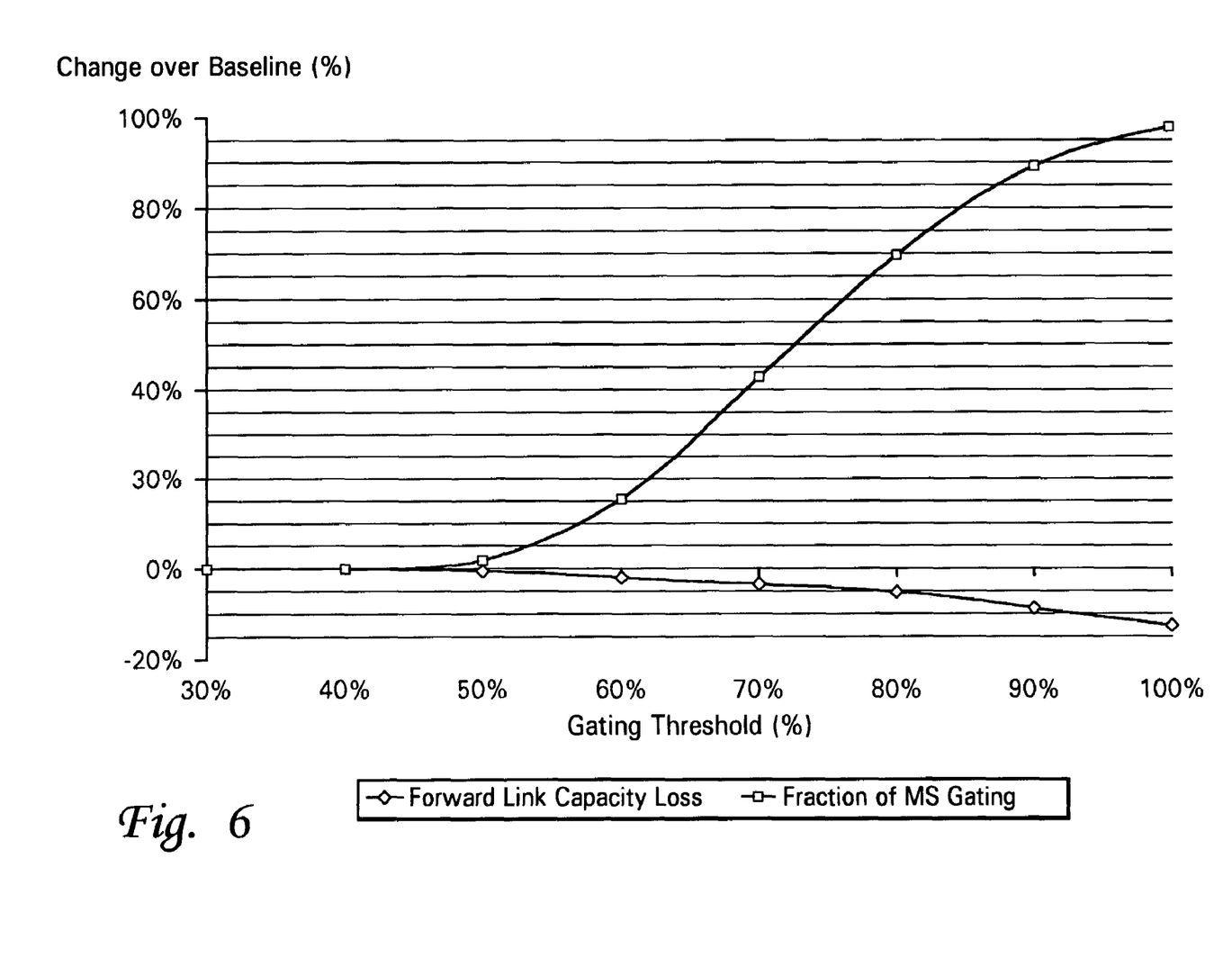
FIG. 6 shows a graph of the forward link capacity loss and the fraction of users being gated as a percent verses the loading threshold set as a percent of the load on the forward link to graphically depict the trade-off between forward link capacity and reverse link battery life extension resulting from the enablement of eighth-rate gating as a function of the pre-determined loading threshold, in accordance with the preferred embodiment.

FIG. 6 graphically depicts the trade-off between forward link capacity and reverse link battery life extension resulting from the enablement of eighth-rate gating as a function of the pre-determined loading threshold, in accordance with the preferred embodiment. As seen in FIG. 6, the Y-axis of the graph plots both the forward link capacity loss and the fraction of users being gated as a percent. The X-axis of the graph in FIG. 6 plots the loading threshold set as a percent of the load on the forward link. When a 100% loading threshold is used, whereby all users are gated at all times, we have observed a 13% forward link capacity impact. With a loading threshold of 80%, a 5% capacity loss is observed, while approximately 70% of the users are gating. This indicates that in the long term, 70% of the users would still extend the life of their battery with a minimum but measurable forward link capacity loss on the system.

The simulation creating the graph of FIG. 6 is a Monte-Carlo simulation that models the call arrival and departure process in a single sector. The power distribution and standard deviation is obtained during simulation calibration. The call arrival is assumed to be a Poisson process, and the service time exponentially distributed with 120 s mean call time. The call arrival rate is the mean time divided by the Offered Eriangs into the system. The Offered Eriangs is an input into the simulation. The simulation is calibrated to insure 26.4 Carried Eriangs for 2% call blocking. The power used per user is statistically generated with a mean level that results in the 26.4 Carried Eriangs at 2% call blocking. The power generated has a standard deviation of 4 dB and is log normal in distribution. Once the switch threshold is applied, the Offered Eriangs is adjusted in the system to maintain 2% call blocking, and the number of users gating on average is computed. Users that gate have the mean power adjusted up by 0.42 dB. We assume overhead power at 25%. Once a user is allocated a power level it maintains this power level until the call terminates. Therefore, the sector may have a mix of users with gating on and gating off. If a user is handing off to another sector, then the gating on/off switch can be accomplished using the UHDM (Universal Handoff Direction Message). In other words, if any of the sectors in the active set have exceeded the switch threshold, which implies no gating, then gating is switched off. Therefore, any time there is a handoff updated, the gating feature can be toggled if necessary. Without handoff updates, the call uses the format it was last assigned until call termination. It should be noted that the simulation creating the graph of FIG. 6 did not consider soft hand off, and no hysterisis was built into the loading threshold.

There are a number of embodiments of the present invention for handling hand-offs between BTSs within the wireless communication system. When a MS is handed off from one BTS to another, an algorithm executing within the BSC decides if the eighth-rate gating is continued for the transferred MS. In a first embodiment, thresholds are used to switch on/off gating only for new calls; existing calls are allowed to continue with the feature as previously set/reset at initiation until call termination. If a mobile call originates in a handoff boundary, gating can be decided by the strongest sector, or by the OR/AND rule. In this rule, if any of the sectors request gating off, then it is gated off, if all the sectors request gating on, then it is gated on.

In a second embodiment, thresholds are used to switch on/off gating only for new calls. When a handoff occurs, the gating mode is changed by the UHDM (Universal Handoff Direction Message) message using the AND/OR rule of the sectors in the active set. This case results in some excessive messaging in the system but not as much as the first embodiment described above. In a third embodiment, thresholds are used to switch on/off gating only for new calls. During handoff of the call, if any sector requires the gating mode to be off (operating at higher loading relative to switch threshold), then the terminal is instructed to use gating off (given it is currently using gating on). However, if all sectors prefer gating on, but the terminal is gating off at the time of the handoff, it remains gating off. This has less messaging implications than the second embodiment and more than the first.

In an alternative embodiment, the dynamic control of reverse FCH gating in accordance with principles of the invention may be implemented as a computer program-product for use with a data processing system. The programs defining the functions of the preferred embodiment can be delivered to the data processing system and/or to a peripheral device for installation on a connected adapter via a variety of signal-bearing media or computer readable storage media, which include, but are not limited to: (a) information permanently stored on non-write storage media, e.g., read only memory devices within either computer such as CD-ROM disks readable by CD-ROM; (b) alterable information stored on write-able storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

While the invention has been particularly shown and described with reference to a preferred embodiment, it will be understood by those skilled in the art that various changes in form and detail may be made therein without departing from the spirit and scope of the invention.

What is claimed is:

1. A method of transmission gating a reverse fundamental channel in a wireless communication system, the method comprising the steps of:
   dynamically switching on and switching off reverse link fundamental channel transmission gating as a function of a forward link loading within a sector of a base station in the wireless communication system, wherein the reverse link fundamental channel transmission gating is switched off in response to the forward link loading having a first relationship with respect to a predefined threshold, and wherein the reverse link fundamental channel transmission gating is switched on in response to the forward link loading having a second, different relationship with respect to the predefined threshold.

2. The method of claim 1, wherein the reverse link fundamental channel transmission gating is dynamically switched on and switched off for all mobile stations in the sector of the base station.

3. A method of transmission gating a reverse fundamental channel in a wireless communication system, the method comprising the steps of:
   dynamically controlling reverse link fundamental channel transmission gating as a function of a forward link loading within a sector of a base station in the wireless communication system, wherein dynamically controlling the reverse link fundamental channel transmission gating comprises:
      dynamically switching off the reverse link fundamental channel transmission gating in the sector of the base station when a forward link loading threshold is exceeded in that sector; and
      dynamically switching on the reverse link fundamental channel transmission gating in the sector of the base station when the forward link loading threshold is not exceeded in that sector.

4. The method of claim 3, wherein the steps of switching only occur once at the initialization of a call for a given mobile station in the wireless communication system to place the reverse link fundamental channel transmission gating in an initial switched state, and thereafter maintaining the reverse link fundamental channel transmission gating in the initial switched state for the mobile station regardless of subsequent dynamic changes in the forward link channel capacity.

5. The method of claim 3, wherein the forward link loading threshold is set between 75-85%.

6. The method of claim 1, wherein the reverse link fundamental channel transmission gating is applied to an eighth rate frame.

7. The method of claim 1, wherein dynamically switching on and switching off reverse link fundamental channel transmission gating is a function of the forward link loading within a subset of plural sectors having the least excess capacity during a handoff of the mobile station between the sectors.

8. A method of transmission gating the reverse fundamental channel in a wireless communication system, the method comprising the steps of:
   analyzing forward link loading within a sector of a base station in the wireless communication system;
   determining if a current loading of the forward link within the sector of the base station is greater than a pre-determined loading threshold; and
   if the determining step indicates that the current loading of the forward link of the base station is not greater than the pre-determined loading threshold, setting transmission gating for the reverse fundamental channel.

9. The method of claim 8, further comprising assigning a fundamental channel to a mobile station at the initiation of a call with the mobile station within the sector of the base station.

10. The method of claim 9, wherein the step of setting comprises setting the transmission gating for the mobile station initiating the call.

11. The method of claim 8, wherein the step of setting comprises setting the transmission gating for all mobile stations in the sector.

12. The method of claim 8, further comprising the step of:
   if the determination step indicates that the current loading of the forward link of the base station is greater than a pre-determined loading threshold, resetting the transmission gating for the reverse fundamental channel.

13. The method of claim 8, wherein the steps are repeated until at least one call initiated with a mobile station within the sector of the base station has terminated.

14. The method of claim 8, wherein the pre-determined loading threshold comprises at least two pre-determined loading thresholds set to provide hysterisis of the pre-determined loading threshold.

15. The method of claim 8, wherein the pre-determined loading threshold is set between 75-85%.

16. The method of claim 12, wherein the resetting step is performed if it is determined that the forward link loading within a subset of the sector having the least excess capacity is greater than the pre-determined loading threshold during a handoff of the mobile station from one subset of sectors to another.

17. An article comprising computer readable storage media including a program embedded therein that when executed causes a computer to:
   analyze forward link channel capacity within a sector of a base station in a wireless communication system;
   determine if a current loading of the forward link channel capacity within the sector of the base station is greater than a pre-determined loading threshold; and
   if the determination step indicates that the current loading of the forward link channel capacity of the base station is not greater than the pre-determined loading threshold, set transmission gating for the reverse fundamental channel.

18. The article according to claim 17, wherein the program when executed causes the computer to further assign a fundamental channel to a mobile station at the initiation of a call with the mobile station within the sector of the base station.

19. The article according to claim 17, wherein the step of setting comprises setting the transmission gating for all mobile stations in the sector.

20. The article according to claim 17, wherein the program when executed causes the computer to further:
   if the determination step indicates that the current loading of the forward link channel capacity of the base station is greater than a pre-determined loading threshold, reset the transmission gating for the reverse fundamental channel.

21. The article according to claim 17, wherein the steps are repeated until at least one call initiated with a mobile station within the sector of the base station has terminated.

22. The article according to claim 17, wherein the pre-determined loading threshold is set between 75-85%.

23. The article according to claim 20, wherein the resetting step is performed if it is determined that the forward link loading within a subset of the sector having the least excess capacity is greater than the pre-determined loading threshold during a handoff of the mobile station from one subset of sectors to another.

24. A wireless communication system comprising:
   a memory device;
   a processor coupled to the memory device configured to dynamically control a reverse link fundamental channel transmission gating as a function of a forward link loading within a sector of a base station in the wireless communication system,
   wherein the processor is configured to dynamically switch off the reverse link fundamental channel transmission gating in the sector of the base station when a forward link loading threshold is exceeded in that sector, and dynamically switch on the reverse link fundamental channel transmission gating in the sector of the base station when the forward link loading threshold is not exceeded in that sector.

25. The wireless communication system of claim 24, wherein the reverse link fundamental channel transmission gating is dynamically controlled for all mobile stations in the sector of the base station.

26. The wireless communication system of claim 25, wherein the processor performs a switch only once at the initialization of a call for a given mobile station in the wireless communication system to place the reverse link fundamental channel transmission gating in an initial switched state, and thereafter maintains the reverse link fundamental channel transmission gating in the initial switched state for the mobile station regardless of subsequent dynamic changes in the forward link channel capacity.

27. The wireless communication system of claim 25, wherein the forward link loading threshold is set between 75-85%.

28. The wireless communication system of claim 25, wherein the reverse link fundamental channel transmission gating is applied to an eighth rate frame.

29. A wireless communication system comprising:

a memory device;

a processor coupled to the memory device configured to dynamically control a reverse link fundamental channel transmission gating as a function of a forward link loading within a sector of a base station in the wireless communication system, wherein the processor dynamically controls reverse link fundamental channel transmission gating as a function of the forward link loading within a subset of plural sectors having the least excess capacity during a handoff of the mobile station between the sectors, wherein the reverse link fundamental channel transmission gating is switched off in response to the forward link loading having a first relationship with respect to a predefined threshold and wherein the reverse link fundamental channel transmission gating is switched on in response to the forward link loading having a second, different relationship with respect to the predefined threshold.

* * * * *